2 Sheets--Sheet 1.

SAMUEL RAY & MOSES R. SHALTERS.

Improvement in Harvesters.

No. 4,824. Reissued March 26, 1872.

Witnesses
Wm. J. Allen
Chas. Rinehart

John F. Lebealing
Assignor of Sam'l Ray & M. R. Shalters Inventors

THE NORRIS PETERS CO., PHOTO-LITHO., WASHINGTON, D. C.

2 Sheets--Sheet 2.

SAMUEL RAY & MOSES R. SHALTERS.

Improvement in Harvesters.

No. 4,824. Reissued March 26, 1872.

Witnesses
Wm. J. Allen
Chas. Ambach

John F. Laborling
Assignee of
Saml. Ray
M. R. Shalters
Inventors

THE NORRIS PETERS CO., PHOTO-LITHO., WASHINGTON, D. C.

UNITED STATES PATENT OFFICE.

SAMUEL RAY AND MOSES R. SHALTERS, OF ALLIANCE, ASSIGNORS TO JOHN F. SEIBERLING, OF AKRON, OHIO.

IMPROVEMENT IN HARVESTERS.

Specification forming part of Letters Patent No. 23,707, dated April 19, 1859; reissue No. 2,230, dated April 17, 1866; reissue No. 4,824, dated March 26, 1872.

DIVISION A.

*To all whom it may concern:*

Be it known that SAMUEL RAY and MOSES R. SHALTERS, both of Alliance, in the county of Stark and State of Ohio, did invent certain new and useful Improvements in Mowers and Harvesters, of which the following is a full, clear, and exact description, reference being had to the accompanying drawing, in which—

Figure 1:
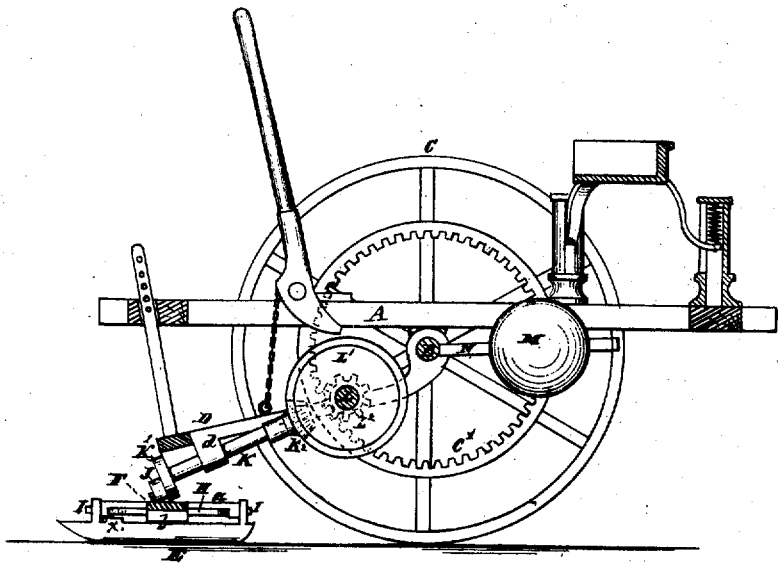
Figure 2:
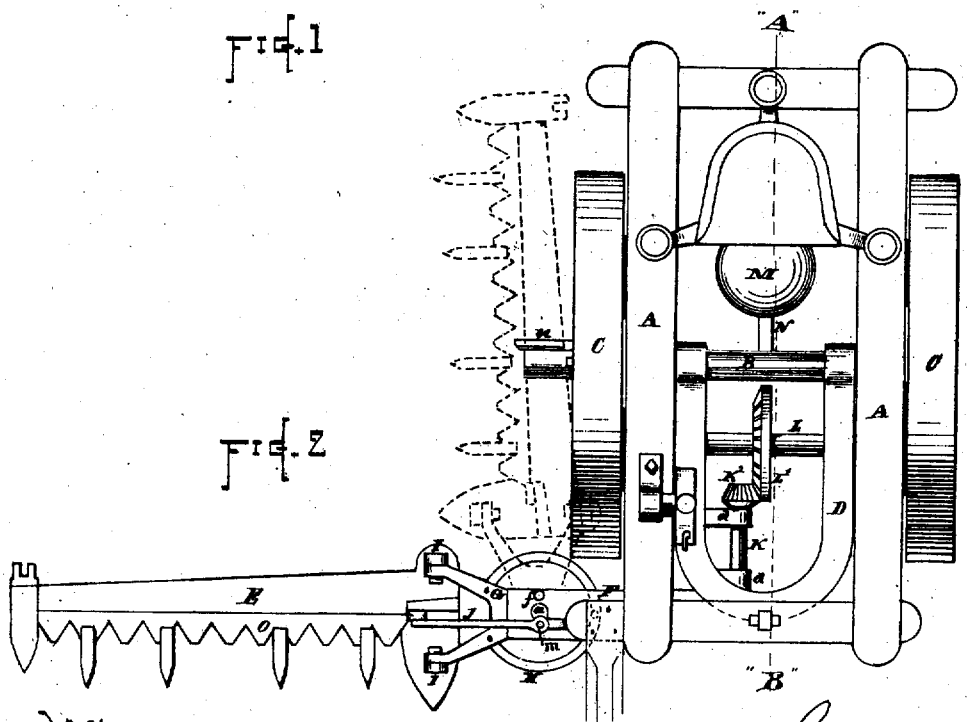
Figure 3:
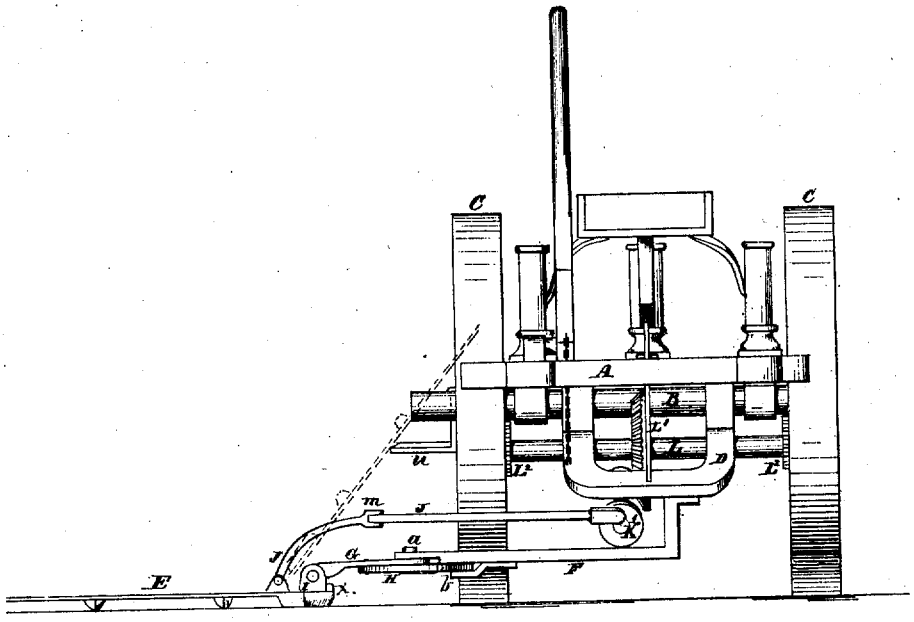
Figure 4:
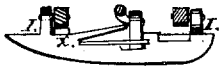

Figure 1 represents a central vertical section on line A B, Fig. 2, of a mower or harvester embracing said RAY and SHALTERS' improvements. Fig. 2 represents a plan or top view of the machine, the finger-beam and cutter-bar being shown, folded horizontally to the rear, by dotted lines. Fig. 3 represents a front view of the machine, the finger-beam and cutter-bar being shown, folded up, by dotted lines; and Fig. 4 represents a cross-section just inside of the shoe, which supports the heel of the finger-beam, for the purpose of representing the stiffening-lug X on the shoe.

The nature of that part of the said RAY and SHALTERS' invention which forms the subject-matter of this division of reissue relates to horizontally-folding finger-beams for mowers and harvesters; and consists, first, in a horizontally-folding finger-beam, as will be hereinafter described; and, second, in the combination of certain peculiarly-constructed devices for holding or retaining the finger-beam in working position, and also for allowing it to be horizontally folded, as will be hereinafter described.

In the drawing, the parts marked A represent the main frame, which is mounted by means of suitable bearings upon the axle B, upon the ends of which are the main supporting traveling-wheels C C. The rear end of a bow-shaped gear-supporting frame, D, is fixed or attached to axle B, and is also provided with a rear-projecting rod, N, upon which is arranged a gear-counterpoising weight, M, that can be adjusted nearer to or further from axle B, in order to obtain and secure the desired counterbalancing of frame D and the gearing supported thereon. To the forward part of the gear-frame D is fastened a laterally-projecting bar, F, to the outer end of which a forked hinge-plate, G, is pivoted by the vertical pintle or stud *a*, said plate being arranged to swing or turn in a horizontal plane around the pintle *a*. A bearing-ring, H, is riveted to the under side of the fork-plate G, and is supported at one side between the bar F and the bearing-hook *b* as it turns or swings around freely with plate G. To the outer forked ends of the plate G the shoe which supports the finger-beam E is attached by hinge-joints I, which permits the finger-beam to rise and fall to conform to the undulations of the ground, and also admits of the finger-beam being turned or swung upward in a vertical plane, so that the finger-beam with its cutter-bar can be folded upward on the joints I, as indicated in dotted lines in Fig. 3; or it can be folded around to one side of the machine in a horizontal direction by turning it on the stud or pintle *a*, as indicated by dotted lines, Fig. 2; and by unhooking the connecting-rod the finger-beam can be folded forward. In practice, however, the folding of the finger-beam to the rear is preferable. This lateral folding of the finger-beam is very convenient and desirable when the machine is to be stored, or transported, or moved from one field to another.

It will be understood that the plate G and the finger-beam are prevented from turning horizontally when the machine is in use by reason of the locking or securing of the plate G to the bar F, which is effected in this instance by means of a pin, *f*, which is passed through holes made in both the bar F and plate G. When the finger-beam is folded back it may be supported by a rest or hook, *u*, thus relieving the side draft in transportation. The cutter-bar O is actuated, by the jointed connection-rod J, from the crank-plate or balance-wheel $K^1$ on the end of the crank-shaft or spindle K, which latter is supported and turns in bearings *d d* on the frame D, and is operated by the bevel-pinion $K^2$ on its rear end, and which gears into the bevel-gear $L^1$ on the gear-shaft L, which is also mounted in suitable bearings upon the frame D, and is provided with spur gears or pinions $L^2$ at its ends that mesh with the gears C′ on the driving-wheels C.

It will be noticed or observed that the frames A and D and the traveling-wheels C and driving-gear C′ all move or turn on the same axis—viz., the center of the axle B—so that the driving-gear C′ and pinions $L^2$ will always accurately mesh with each other independently of the relative position of the frames A and D in regard to each other. The strong broad hinge or devices for horizontally folding the finger-beam may be varied, and yet efficiently perform the same function or movement. The outer end of the connection or pitman rod J will turn back freely, when the finger-beam is folded back, by reason of its joint *m*.

Other portions of the machine shown in the drawing will be more fully described and claimed in another division of reissue of even date herewith.

Having thus fully described that part of RAY and SHALTERS' invention which forms the subject-matter of this division of reissue, what is claimed as their invention, and desired to have secured by Letters Patent, is—

1. The combination of the finger-beam in a harvesting-machine with the outer end of the bar by which it is supported and drawn by means of two hinge-joints, one having a vertical and the other a horizontal axis arranged at or near the shoe, which supports the heel or inner end of the finger-beam, whereby the finger-beam and cutting apparatus can not only be conveniently folded vertically to the side of the machine, but also horizontally to a position or line at a right angle or nearly so to the working position of said beam or cutting apparatus, substantially as and for the purposes stated.

2. The combination, with the finger-beam and bar F, of the hinged forked plate G, substantially as and for the purposes set forth.

3. The combination, with bar F and hinged plate G, of the holding-pin, substantially as and for the purposes set forth.

4. The combination, with the hinged plate G and bar F, of the bearing-ring H and supporting-hook *b*, substantially as and for the purposes set forth.

5. The combination, with the horizontally-folding finger-beam, of the jointed connecting or pitman rod J, as shown and described.

JOHN F. SEIBERLING.

Witnesses:
WM. T. ALLEN,
CHAS. RINEHART.